(12) United States Patent
Sasaki

(10) Patent No.: US 6,650,355 B2
(45) Date of Patent: Nov. 18, 2003

(54) PHOTO PRINTER

(75) Inventor: Hidemi Sasaki, Saitama (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 18 days.

(21) Appl. No.: 09/760,654

(22) Filed: Jan. 17, 2001

(65) Prior Publication Data

US 2001/0009436 A1 Jul. 26, 2001

(30) Foreign Application Priority Data

Jan. 20, 2000 (JP) ........................................ 2000-012001

(51) Int. Cl.[7] ................................................. B41J 2/435
(52) U.S. Cl. ........................................ 347/264; 347/262
(58) Field of Search ............................... 347/262, 264, 347/228, 140; 396/206, 207, 429, 430

(56) References Cited

U.S. PATENT DOCUMENTS 6,314,248 B1 * 11/2001 Ohmura et al. ............. 396/429

FOREIGN PATENT DOCUMENTS

| JP | 6-153139 | * | 5/1994 | ............ H04N/5/84 |
| JP | 9-211606 | * | 8/1997 | ............ G03B/17/00 |
| JP | 11-127409 |   | 5/1999 | .......... H04N/5/765 |

* cited by examiner

*Primary Examiner*—Hai Pham
(74) *Attorney, Agent, or Firm*—Sughrue Mion, PLLC

(57) ABSTRACT

A lock claw is provided on a pack loading door for opening a pack loading chamber. A lock lever is attached to the pack loading chamber. The lock lever is movable between a lock position where a lock claw engages with the lock claw, and a release position where a lock claw is away from the lock claw. The camera has a system controller and a film counter. The film counter counts a remaining number that represents the number of the instant film left inside the pack loading chamber. When a lock release button is operated, the system controller checks the remaining number. If the remaining number is equal to zero, the system controller controls a feeding motor to rotate inversely, so that the lock lever moves to the release position. If the remaining number is more than zero, the system controller keeps the lock lever at the lock position.

14 Claims, 15 Drawing Sheets

PHOTO PRINTER

BACKGROUND OF THE INVENTION

1. Field of the Invention

The present invention relates to a photo printer in which an image is recorded onto a photosensitive recording material loaded in a loading chamber. More particularly, the present invention relates to a photo printer capable of preventing the loading chamber from being opened while the recording material is loaded herein.

2. Background Arts

An electronic still camera having a printing device is disclosed in Japanese Patent Laid-Open Publication No. 11-127409, in which a photo printer and a mono-sheet type instant film are used as a printing device and a recording material, respectively. Compared to a thermal printer such as a thermal transfer printer or a thermal sublimation printer, the photo printer consume so less electricity as to be driven by internal batteries. Accordingly, the photo printer has the advantage of portability. Moreover, compared to an inkjet printer, which is necessary to manage inks, the photo printer has the advantage to work without maintenance.

In the photo printer, like an ordinary instant camera, a film pack is used as a basic unit for handling the instant films. The film pack is loaded inside a pack loading chamber provided in the electronic still camera. The pack loading chamber is kept in light-tight fashion, by closing a pack loading door that is used as a cover. The instant film is exposed to printing light projected from a printing head, latent image is formed on the instant film. After an exposure, the instant film is ejected through a pair of spread rollers. During ejection, a positive image is developed.

The electronic still camera converts an optical image of a subject to an electric image signal through a CCD image sensor or the like, convert the image signal to digital image data, which is written in an image memory. Since an exposure is started by selecting image data from the image memory, it is possible to carry out taking a subject even if a film pack is unloaded. Compared to an ordinary instant camera, an user of the electronic still camera is less aware whether the film pack is loaded, or of the remaining number of available instant films. Therefore, there is possibility that the pack loading chamber is opened by mistake while an unexposed instant film is loaded inside the pack loading chamber.

SUMMARY OF THE INVENTION

In view of the foregoing, an object of the present invention is to provide a photo printer for preventing a pack loading chamber from being opened while an instant film is loaded herein.

Another object of the present invention is to provide a photo printer in which a pack loading door for opening the pack loading chamber is moved by a simple structure and at a low cost.

To achieve the above objects, a printer of the present invention is comprised of counting means for counting remaining number that represents an amount of the instant film left inside the pack loading chamber, and control means for checking the remaining number and prohibiting the pack loading door from being open when the remaining number is equal to or more than one. The photo printer has a operation member that is operated externally for opening the pack loading chamber. When the operation member is operated over a predetermined time continuously, the control means checks the remaining number.

The counting means subscribes the remaining number by one each time the instant film is ejected outside of the photo printer, and sets the remaining number for an initial value when the film pack is loaded inside the pack loading chamber.

In the preferable embodiment of the present invention, the photo printer has a door moving mechanism that is comprised of a lock lever and a rotating lever. The lock lever is movable between a keep position for locking the pack loading chamber and a release position for releasing the lock of the pack loading chamber. The rotating lever pushes the lock lever toward the release position when rotating forward and retracts from the lock lever when rotating inversely.

The photo printer has driving means that is comprised of a feeding motor for feeding the instant film toward outside of the photo printer, a primary gear for transmitting rotation of the feeding motor to the rotating lever, and a secondary gear for transmitting rotation of the primary gear to developing means. The primary gear rotates the rotating lever inversely when the feeding motor rotates in a first direction, and rotates the rotating lever forward when the feeding motor rotates in a second direction.

The photo printer has delay transmitting means that is comprised of a pin attached to the primary gear and a groove provided in the secondary gear. Rotation of the primary gear is not transmitted to the secondary gear while the pin moves along the groove.

According to the present invention, since the pack loading door is not open when the instant film is left inside the pack loading chamber, an unexposed instant film is never exposed to outside light by mistake.

Moreover, since the door moving mechanism is actuated by the feeding motor for actuating the developing means, the printer of the present invention makes it possible to improve its function by a simple structure and at a low cost.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENT

Figure 1:
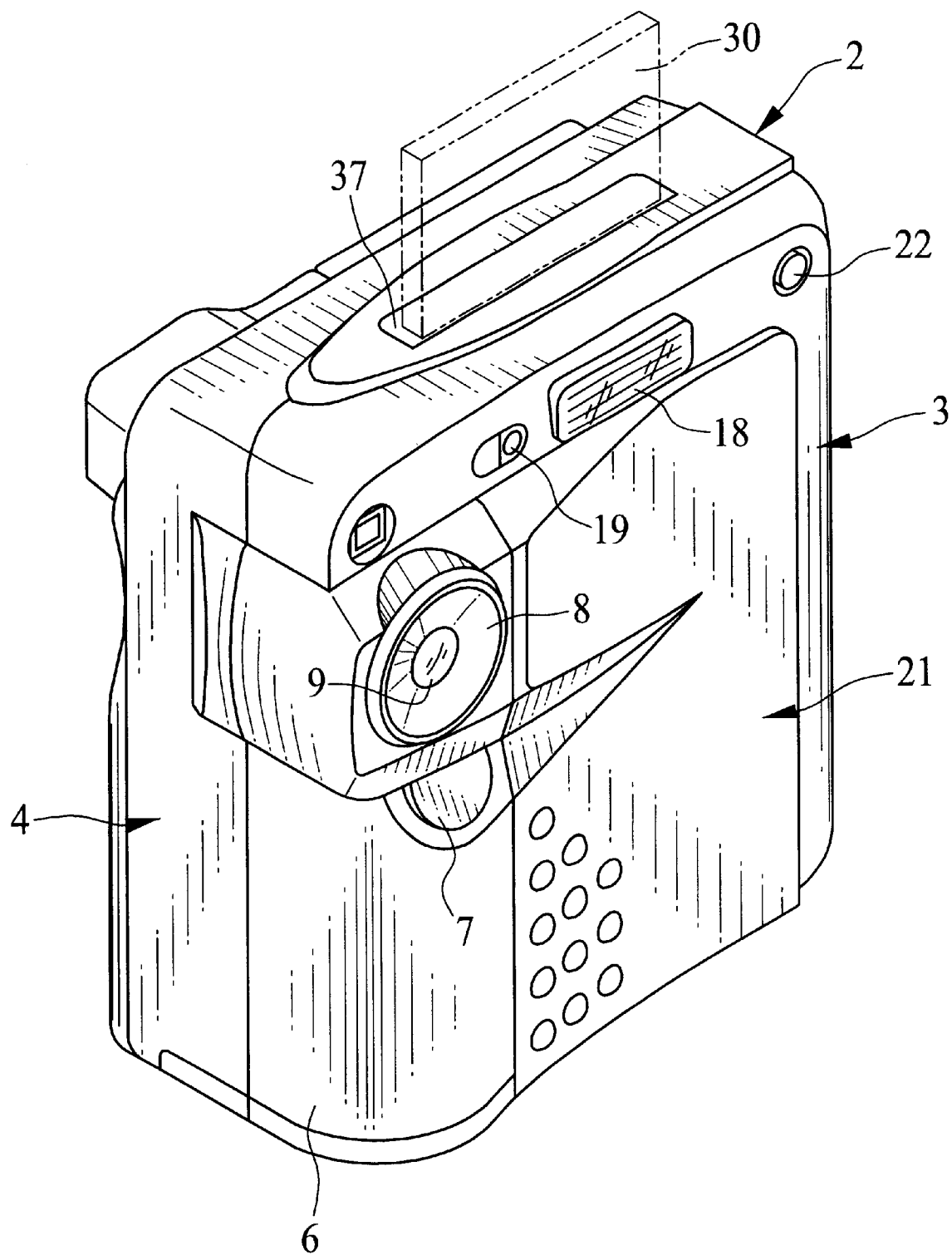
FIG. 1 is a front perspective view showing an electronic still camera incorporated with a printer.
Figure 2:
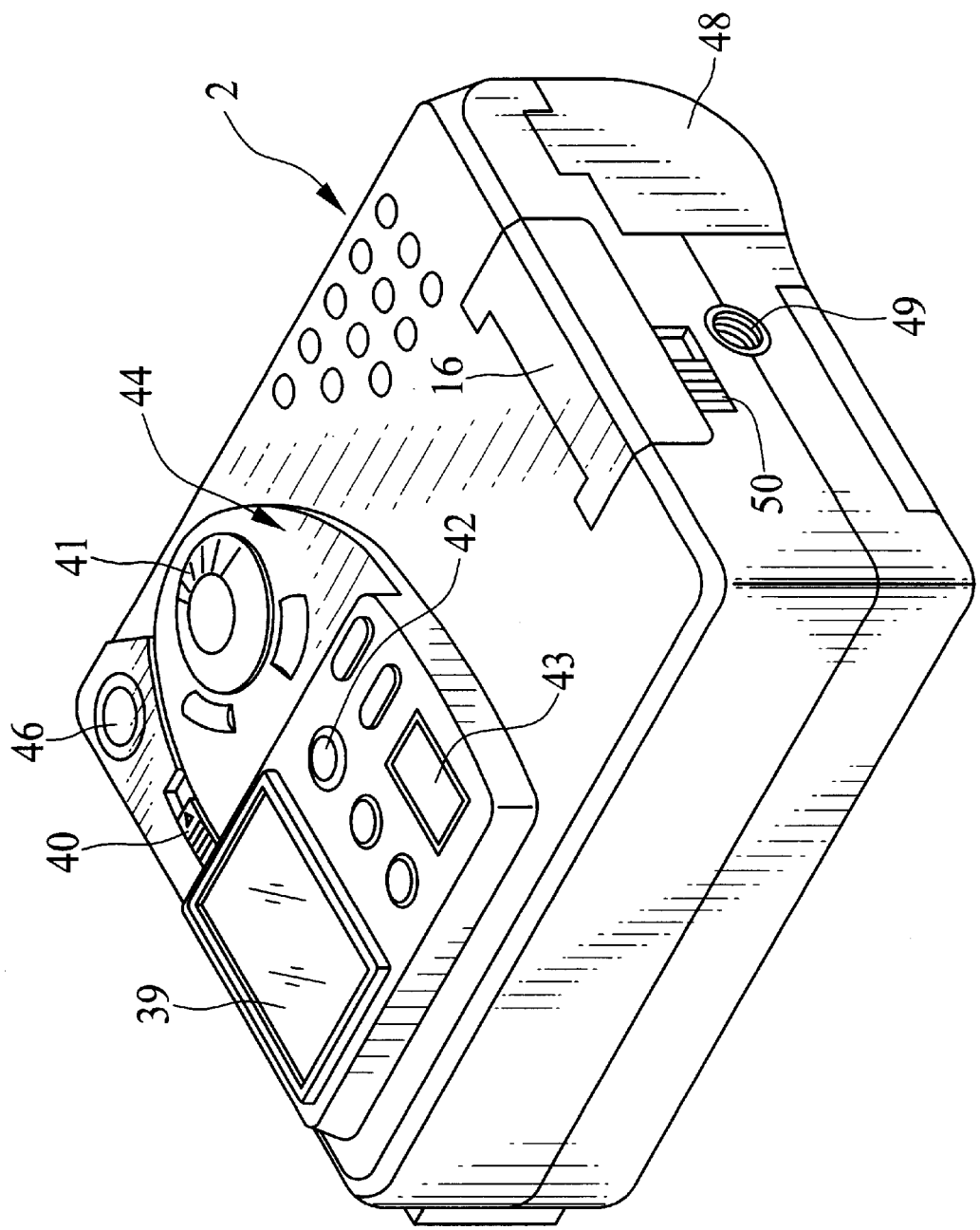
FIG. 2 is a rear perspective view showing the electronic still camera.
Figure 3:
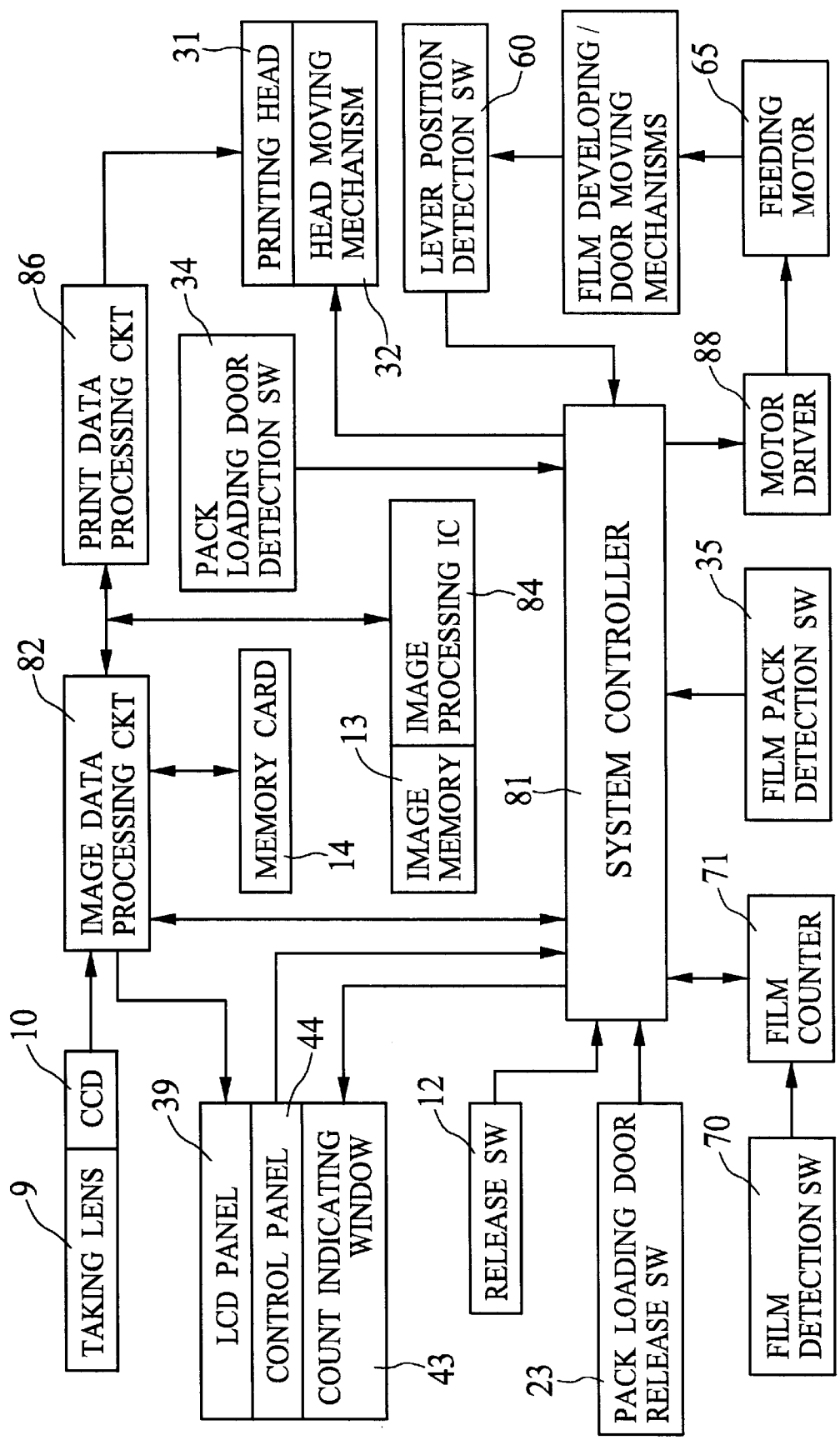
FIG. 3 is a block diagram showing the circuitry of the electronic still camera.

FIGS. 1 and 2 show a front and rear perspective views of an electronic still camera incorporated with a printer 2, hereinafter referred to simply as camera. A block diagram of a circuitry of the camera 2 is shown in FIG. 3. The camera 2 is comprised of a frame member 52 (See FIG. 5), a front cover 3 and a rear cover 4. The frame member 52 is incorporated with a photographing mechanism, a printing mechanism and so forth. The front and rear covers 3 and 4 cover the outside of the frame member.

A grip portion 6, a shutter release button 7, a taking window 8 and a viewfinder window 9 are provided on the front wall of the camera 2 in order along the vertical direction. The grip portion 6 is used for gripping the camera 2. The shutter release button 7 is inclined so as to be operated easily by a forefinger of a right hand that grasps the grip portion 6. A transparent cover glass is covered with the taking window, inside which a taking lens 9, a shutter mechanism, a diaphragm changing mechanism and CCD image sensor 10 are disposed. Photographic subject light through the taking lens 9 is focused on the CCD image sensor 10. A real-image type viewfinder with a Porro prism for erecting an image is incorporated inside the viewfinder window 5.

Upon the shutter release button 7 being depressed, a shutter release switch 12 provided herein is turned on. Then, image data of one frame obtained at that time by the CCD image sensor 10 is written in an image memory 13 or a memory card 14. The image memory 13, which is provided in the camera 2, stores exclusive image data for internal process. The memory card 14, used as an additional image memory, is inserted into a memory card slot provided on the bottom side of the camera 2. The memory card 14 stores widely-used image data that is available to a personal computer, a printer, and so on. A slot cover 16 usually covers the memory card slot to protect the memory card 14.

A flash projector 18 is provided on the upper side of the front wall of the camera 2. A photometry window 19 is provided beside the flash projector 18. Inside the photometry window 19 is provided a photo sensor for receiving flash light reflected by a subject. When the integrated amount of the reflected flash light is over a predetermined level, flash light is extinguished.

An ejection door 37 is provided in the top wall of the camera 2. Inside the ejection door 37, a pair of well-known spread rollers 69 are provided. The ejection door 37 is usually closed. When an exposed instant film 30, which is loaded inside the camera 2 as a recording material, is ejected through the spread rollers 69, the ejection door 37 is pushed by the front end of the instant film 30, such that the ejection door 37 opens outward.

On the rear wall of the camera 2, a control panel 44 is provided. The control panel 44 is comprised of an LCD panel 39, a power switch 40, a changeover dial 41, a print button 42, a count indicating window 43, and so forth. The LCD panel 39 is used not only for displaying an image stored as image data in the image memory 13 and information for operating the control panel 44, but also as a viewfinder for displaying an image taken through the taking lens 9 in real-time fashion. In taking mode, a finder objective window 46 is also available for observing a subject instead of the LCD panel 39. Using the finder objective window 46 is preferable for saving power of a battery.

The changeover dial 41 is used for changing the operation mode of the camera 2 between the taking mode and the printing mode, and for selecting items in setting the condition of the camera 2. The count indicating window 43 has a monotone LCD panel, which indicates remaining number of the instant film 30 loaded inside the camera 2.

On the bottom of the camera 2 are provided a slot cover 16 for covering the memory card slot, a battery loading door 48, an internal thread 49 for setting a tripod, and a slide member 50. The slot cover 16 opens when the slide member 50 is slid. There is a battery loading chamber inside the battery loading door 48. For instance, four R6-type dry batteries may be loaded in the battery loading chamber.

Figure 4:
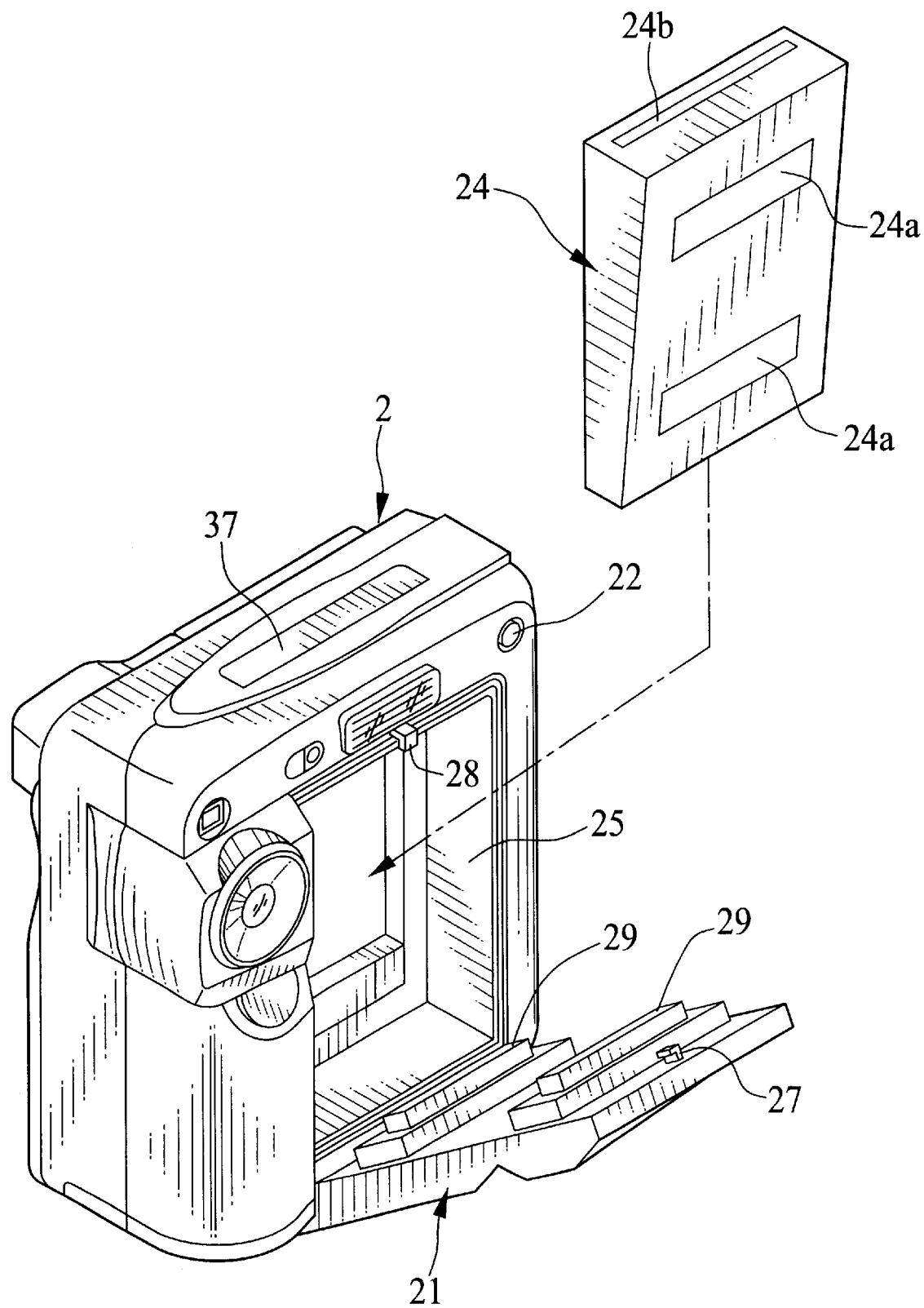
FIG. 4 is a front perspective view showing the electronic still camera in a state where a film loading chamber is opened.

As shown in FIG. 4, a pack loading door 21 is provided below the flash projector 18, as a cover of a pack loading chamber 25. Inside the pack loading chamber 25, a film pack 24 containing a stack of unexposed instant films 30 is loaded. There are two openings 24a and an ejection slit 24b in the rear and top wall of the film pack 24, respectively. The lower end of the pack loading door 21 is axially attached to the camera frame, so the pack loading door 21 is rotatable around its lower end, between an open position where the pack loading chamber 25 is open, and a closed position where the pack loading chamber 25 is closed.

A lock release button 22 is provided beside the flash projector 18. When the lock release button 22 is depressed, a pack loading chamber release switch 23, which is provided herein, is turned on. If the pack loading chamber release switch is turned on for a predetermined time, a door moving mechanism is driven to release a lock of the pack loading door 21 electrically. Thereby, the pack loading door 21 rotates forward so as to open the pack loading chamber 25.

The film pack 24 contains a stack of unexposed instant films 30. For instance, ten instant films 30 may be stacked. The instant film 30 has an exposure area for being exposed to printing light, and a pod containing processing fluid to develop a positive image. When the unexposed instant film 30 is left inside the pack loading chamber 25, the pack loading chamber release switch 23 is not turned on even if the lock release button 22 is depressed. In this case, the lock of the pack loading door 21 is not released, and a warning message is displayed on the LCD panel 39 with an alarm.

A lock claw 27 and two push members 29 are attached to the inner surface of the plate-shaped pack loading door 21. The lock claw 27 is engaged with a lock claw 28 that is attached to the frame member 52. When the film pack 24 is loaded inside the pack loading chamber 25 and the pack loading door 21 is moved to the closed position, the push members 29 are inserted into openings 24a. The push members 29 push the instant films 30 against a bias of a spring (not shown) which is provided inside the film pack 24 and covers the openings 24a. Then, an instant film is pressed tightly to the exposure opening. Thereby, since plainness of the instant film is improved, image quality is also improved. On the outer surface of the pack loading door 21, a plural of hollows are formed for preventing fingers gripping the camera 2 from being slipped.

In the pack loading chamber 25 are provided printing means for printing the instant films 30 contained in the film pack 24, developing means for developing an exposed instant film 30, and a door moving mechanism for locking and unlocking the pack loading door 21. The printing means is comprised of a printing head 31 for projecting printing light on the instant film 30, and a head moving mechanism 32 for moving the printing head 31, and so forth.

The printing head 31 is provided in the pack loading chamber 25 so as to face to the exposure opening of the film pack 24, and projects printing light onto the exposure surface of the instant film 30 through the exposure opening. The printing head 31 contains a liquid crystal segment array, a light emitting element and a color filter. The light emitting element projects white light linearly to the liquid crystal segment array. The liquid crystal segment array has a plural of liquid crystal segments arranged in rows in the direction that is perpendicular to the conveying direction of the instant film. Each liquid crystal segment corresponds to one pixel on print. The liquid crystal array controls printing densities by blocking printing light or controlling light-permeability at each liquid crystal segment. The color filter is consisted of a red-pass filter, a green-pass filter and a blue-pass filter which are disposed between the liquid crystal segment array and the light emitting element.

Three color filters are inserted sequentially between the light emitting element and the liquid crystal segment array each time the printing head 31 makes one scan over the entire exposure area of the instant film 30. Thereby, the printing head 31 can emit printing light of three color components of red, green and blue, onto the instant film 30, such that a full-color latent image is recorded in a three-color sequential fashion.

The head moving mechanism 32 shifts the printing head 31 at a certain speed along the direction in which the instant film 30 is conveyed, such that the printing head 31 is faced to the whole exposure area of the instant film 30. For instance, the head moving mechanism 32 is comprised of a pair of pulleys disposed apart from each other by a length that is longer than the traversal length of the film pack 24, a moving member with which the pulleys are engaged, and a moving motor for shifting the moving member by rotating the pulleys. Both end of the printing head 31 is fixed to the moving member, so the printing head 31 shifts in the direction where the instant film 30 is conveyed according to the movement of the moving member. A stepping motor may be used as the moving motor.

A pack loading door detection switch 34 and a film pack detection switch 35 are provided in the pack loading chamber 25. The pack loading door detection switch 34 detects whether the pack loading door 21 is open or closed. The film pack detection switch 35 detects whether the film pack 24 is loaded inside the pack loading chamber 25.

Figure 5:
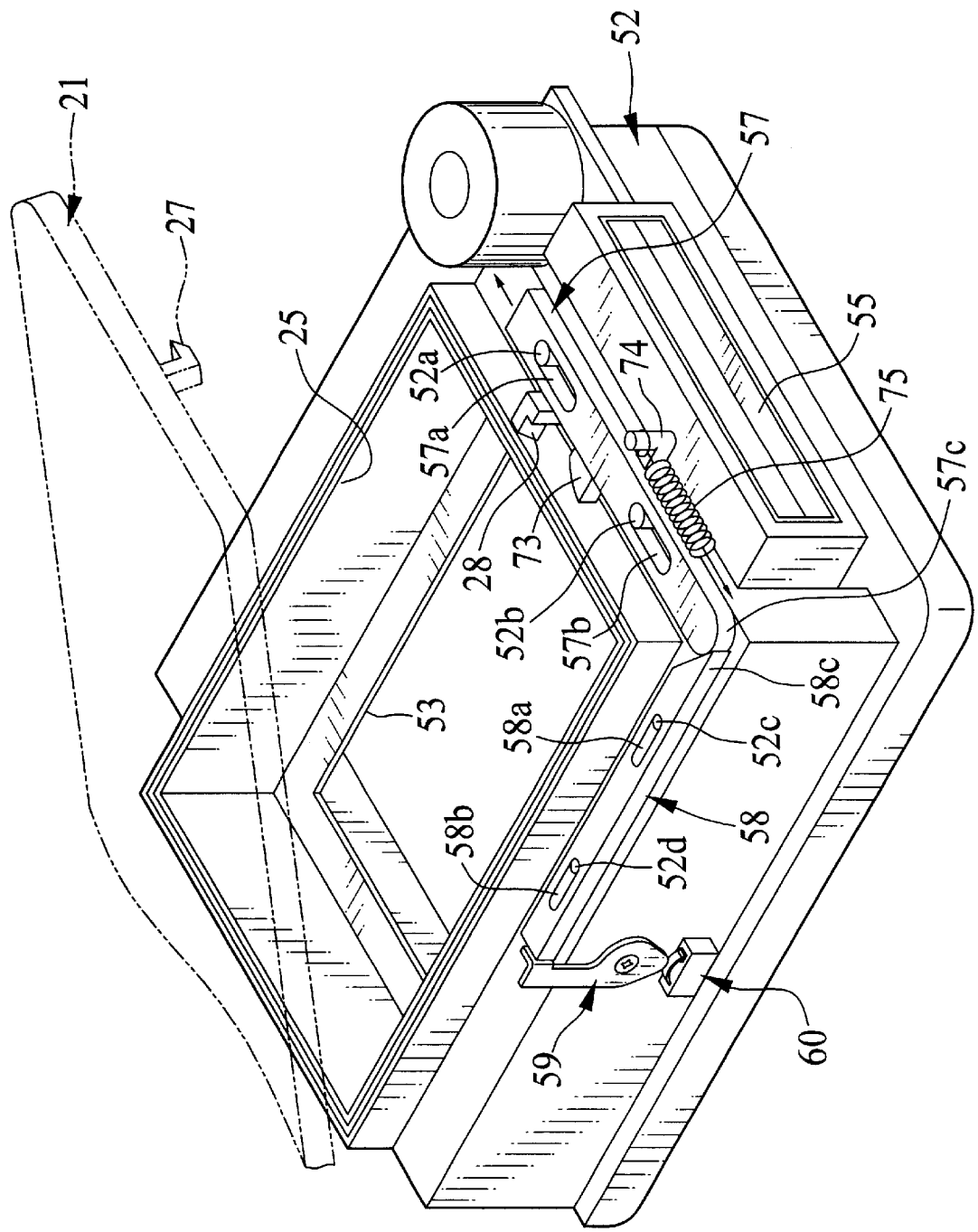
FIG. 5 is a perspective view showing a configuration of a frame member.
Figure 6:
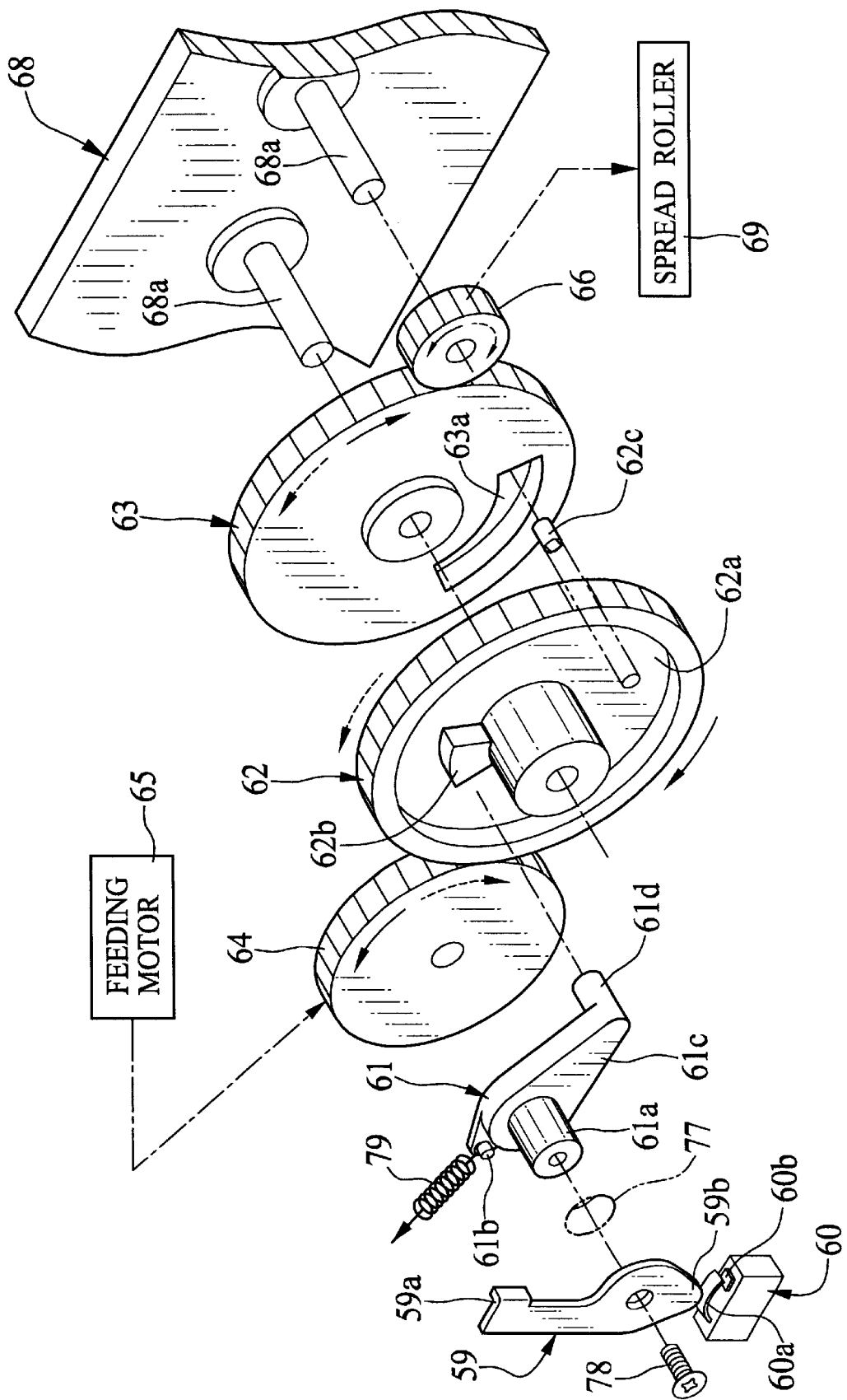
FIG. 6 is an exploded perspective view showing a constitution of a door moving mechanism.

As shown in FIGS. 5 and 6, kinds of mechanisms for photograph and printing are incorporated with a frame member 52 of the camera 2. The frame member 52 contains the pack loading chamber 25. In the bottom of the pack loading chamber 25 is formed an opening 53, which is larger than the exposure opening of the film pack 24. The film pack 24 is retained between the pack loading door 21 and the marginal area around the opening 53. The printing head 31 and the head moving mechanism 32 are disposed below the opening 53.

An ejection passage 55 is formed in the side wall of the frame member 52 that is corresponded to the top wall of the camera 2. The pack loading chamber 25 is connected to the ejection door 37 through the ejection passage 55. An exposed instant film 30 is advanced toward the ejection passage 55 by a claw mechanism. The claw mechanism, which is the same as used in an ordinary instant camera, is comprised of a claw member and a moving mechanism for moving the claw member in the direction where the instant film 30 is conveyed. When the moving mechanism is driven, the claw member inserts into the film pack 24 to push the rear end of the instant film 30. Thereby, the front end of the instant film 30 is advanced towards the ejection passage 55 through the ejection slit 24b.

In the ejection passage 55, a pair of the spread rollers 69 are provided, which comprising developing means. The spread rollers 69 are comprised of a main roller to which a feeding motor 65 produces rotation, and a subsidiary roller that rotates according to rotation of the main roller. When the instant film 30 is advanced to the ejection passage 55, the front end of the instant film 30 is inserted between the main and subsidiary rollers 69. Then, the instant film 30 is conveyed toward the ejection door 37 according to the rotation of the spread rollers. In transporting the instant film 30, the pod is ruptured by the spread rollers 69 to spread processing fluid uniformly inside the whole exposure area of the instant film 30.

Inside the ejection passage 55, there is a film detection switch 70 for detecting passage of the instant film 30. The film detection switch 70 is connected to a film counter 71. The photo film counter 71 counts a remaining number NM that represents the number of the photo films 30 left inside the film pack 24. Each time the film detection switch 70 detects the instant film 30 pass through the ejection passage 55, the film counter 71 subtract the remaining number NM by one.

A door moving mechanism is provided around the pack loading chamber 25. The door moving mechanism is comprised of a lock lever 57, a slide lever 58, a rotating lever 59, a lever position detection switch 60, a push lever 61, a primary cam gear 62, a secondary cam gear 63, and so forth. The primary cam gear 62 is engaged with a gear 64, which transmits rotation of the feeding motor 65. The secondary cam gear 63 is engaged with a gear 66 that transmits rotation to the spread rollers 69. Accordingly, the door moving means and the spread rollers 69 are driven by the feeding motor 65, and share these gears for transmitting the torque of the feeding motor 65. These gears are rotatably attached to a rotating axis 68a that is formed integrally with a supporting plate 68. The outer wall of the supporting plate 68 comprises a portion of inner wall of the pack loading chamber 25, so these gears are attached to the side wall of the pack loading chamber 25.

The lock lever 57, which is made of a long and thin plate, has two slots 57a and 57b. On the top wall of the frame member 52 are provided two pins 52a and 52b, which insert into the slots 57a and 57b, respectively. The pins 52a and 52b are slidable within a length of the slots 57a and 57b. The lock lever 57 has the lock claw 28 and a slant portion 73 on one side, a hook pin 74 on the other side. The lock claw 28 engages with the lock claw 27 that is attached to the pack loading door 21. The slant portion 73 contacts with the lock claw 27 when the pack loading door 21 begins moving toward the open position. A lock spring 75 for biasing the lock lever 57 is hooked on the hook pin 74.

Figure 7A:
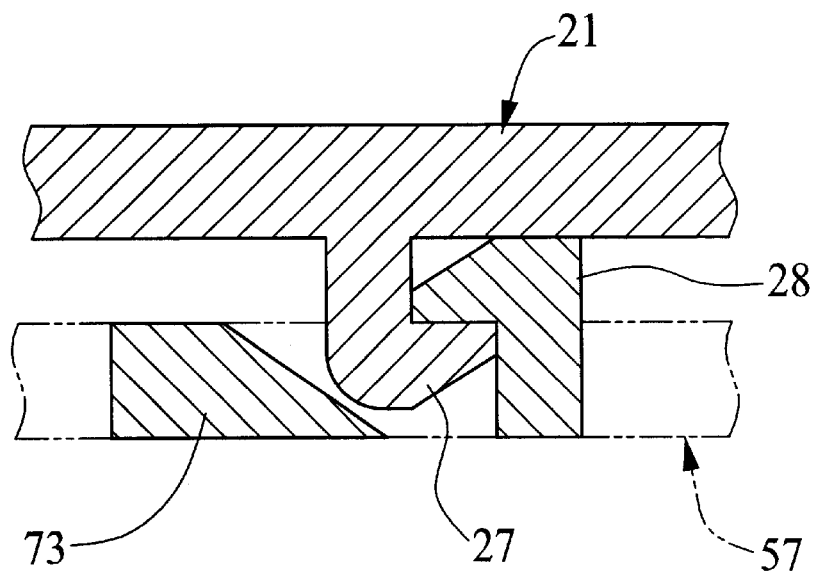
FIG. 7A is a schematic sectional view showing lock claws which are engaged with each other.
Figure 7B:
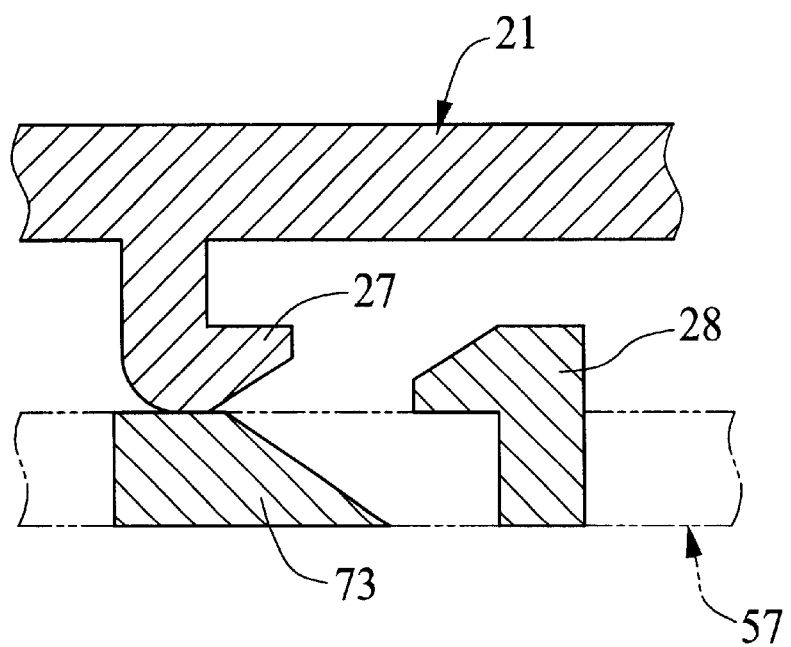
FIG. 7B is a schematic sectional view similar to FIG. 7A, but the lock claws are not engaged.
Figure 8:
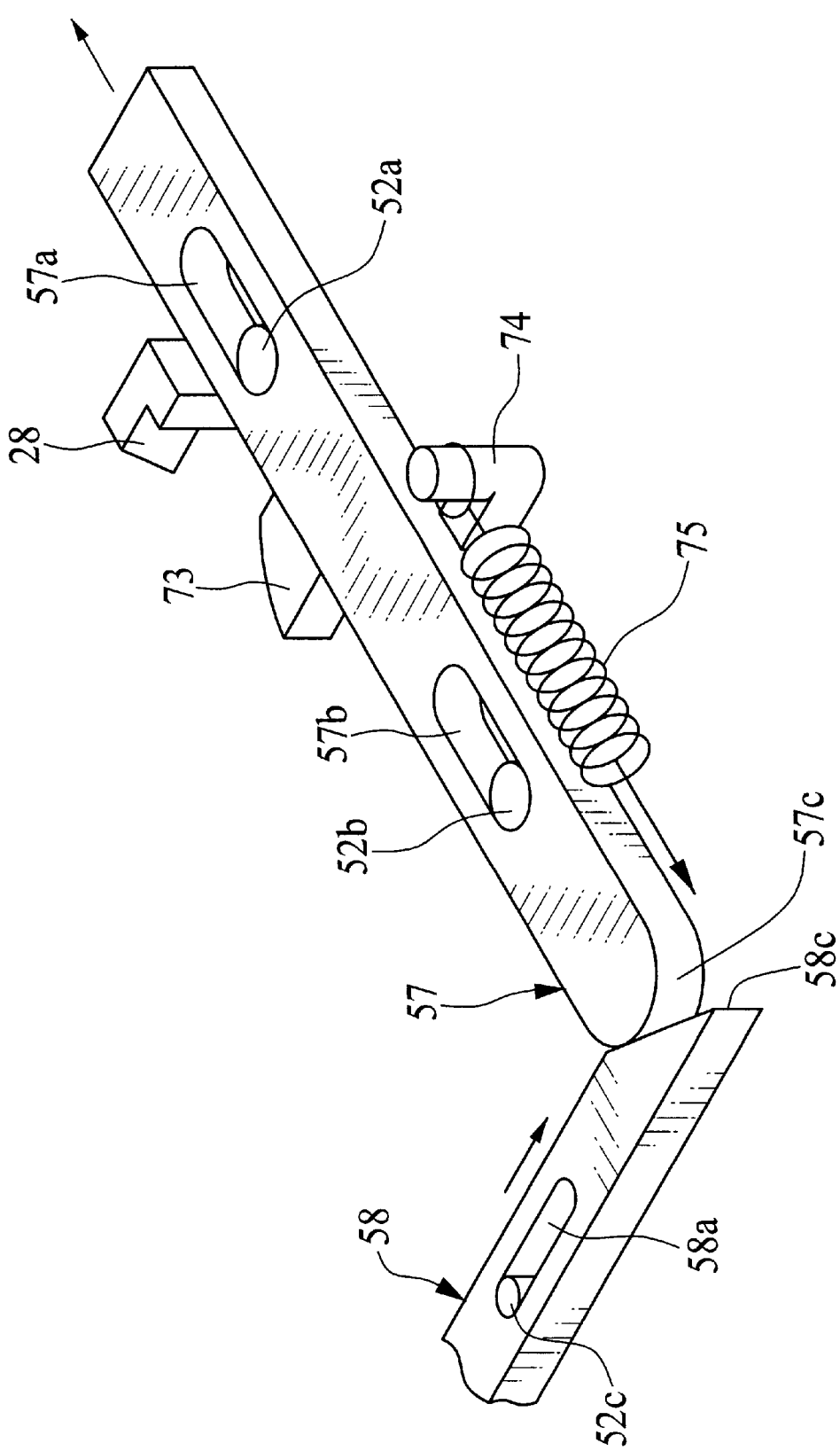
FIG. 8 is a perspective view showing a lock lever and slide lever which are shifted to released positions.

In FIG. 5, the lock lever 57 is usually located at a locked position by the bias of the lock spring 75. As shown in FIG. 7A, when the lock lever 57 is located at the locked position, the lock claw 28 engages with the lock claw 27 for keeping the pack loading door 21 at the closed position. As shown in FIG. 8, the lock lever can slide toward a released position against the bias of the lock spring 75. At that time, the lock claw 28 also slides to release the engagement with the lock claw 27, as shown in FIG. 7B. Then, the lock claw 27 is contacted with the slant portion 73, the slant surface of which pushes the lock claw 27 for releasing the pack loading door 21.

The pack loading door 21 is biased toward the open position by a bias of plane spring or the like that is provided at the lower end thereof. Accordingly, in the case where the slant portion 73 stops pushing the lock claw 27 because the lock lever 57 returns back to the locked position, the lock claw 27 is away from the click to be engaged 28, such that the pack loading door 21 is kept to be unlocked. The lock claw 27 and the lock claw 28 have slanted surfaces that are contacted each other in closing the pack loading door 21. By pushing the pack loading door to the closed position, the lock lever 57 is slid toward the released position, such that the lock claw 27 and the lock claw 28 are engaged with each other.

The lock lever 57 has a rear end 57c that is curved in an arc and is contacted with a slant front end 58c of the slide lever 58. The slide lever 58 has two slots 58a and 58b, in which pins 52c and 52d provided on the top side of the frame member 52 are inserted. The slide lever 58 is movable within the length of the slots 58a and 58b. As shown in FIG. 5, the slide lever 58 is pushed by the lock lever 57 being biased by the lock spring 75, and located at an initial position. The rear end of the slide lever 58 contacts with the rotating lever 59. When the rotating lever 59 rotates clockwise, the rotating lever 59 pushes the rear end of the slide lever 58. Then, the slide lever 58 moves to push the rear end 57c of the lock lever 57 with the slant surface of the front end 58c, such that the lock lever 57 slides to the released position.

Figure 9A:
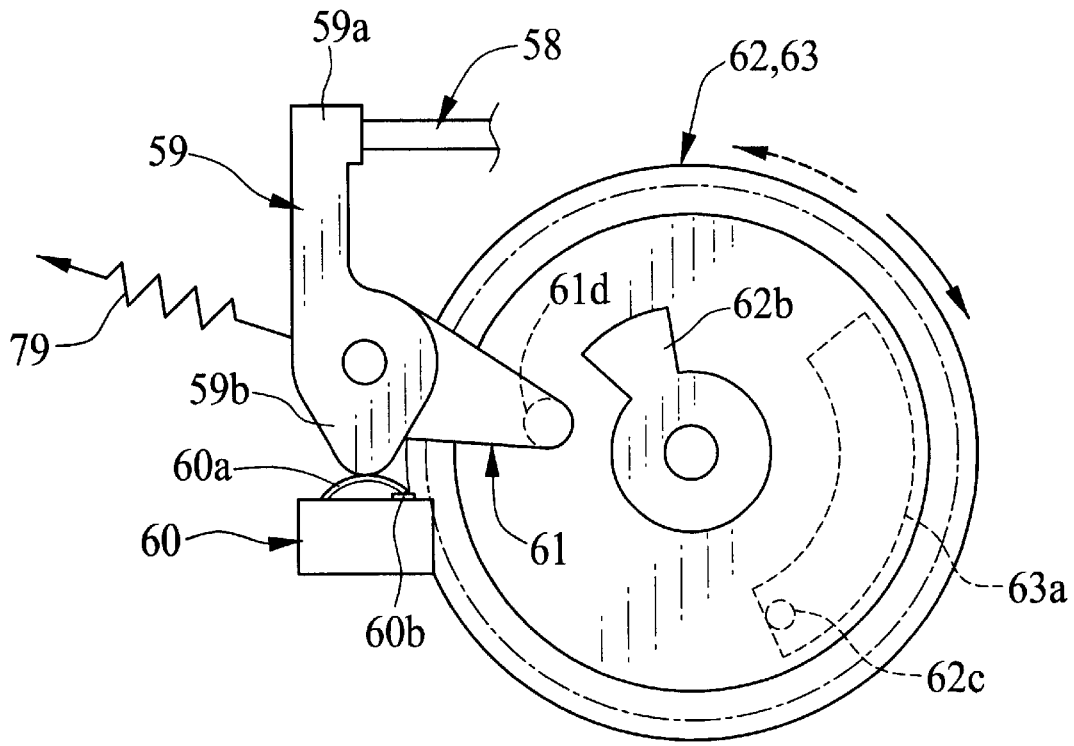
FIG. 9A is an explanatory view showing a door moving mechanism in an initial state.

The rotating lever 59 is made of a bent and thin metal plate, for instance. The rotating lever 59 has an arm portion 59a for pushing the slide lever 58, and a protruded switch portion 59b. As shown in FIG. 9A, the lever detection switch 60 is comprised of two contacts 60a and 60b. The rotating lever 59 and the push lever 61 are rotatably attached around the same rotating axis. The push lever 61 is comprised of a boss 61a, a pin 61b, an interlocking arm 61c and an engaging pin 61d. The boss 61a is protruded through a opening 77 formed in the side wall of the frame member 52. The rotating lever 59 is fixed to the boss 61a by a screw 78, and rotates subsidiary to the rotation of the push lever 61. The rotating lever 59 and the push lever 61 are located at initial positions by a bias of a hold spring 79 which is hooked on the pin 61b. The interlocking arm 61c is protruded radially from the rotating axis of the push lever 61, and has the engaging pin 61 on one end that is protruded toward the primary cam gear 62.

The primary cam gear 62 has a hollow 62a in the surface faced to the push lever 61, in which the engaging pin 61a is inserted. There is a fan-shaped cam 62b in the hollow 62a. When the primary cam gear 62 rotates, the cam 62b presses the engaging pin 61d to rotate the push lever 61 and the rotating lever 59. The primary cam gear 62 has a link pin 62c on the opposite side of the hollow 62a. The link pin 62c is inserted into a cutout 63a formed in the secondary cam gear 63. The link pin 62c and the cutout 63 comprise delay transmission means.

When the feeding motor 65 changes its rotating direction, rotation of the primary cam gear 62 is not transmitted until the link pin 62c contacts the edge of the cutout 63a. Therefore, rotation of the primary cam gear 62 is transmitted to the secondary can gear 63 with a certain time lag. The primary cam gear 62 takes a round clockwise in ejecting the exposed instant film 30 outside the camera 2.

As shown in FIG. 9A, the link pin 62c of the primary cam gear 62 and the cutout 63a of the secondary cam gear 63 are located at the initial positions. In ejecting the instant film 30, the feeding motor 65 rotates forward, the primary cam gear 62 rotates clockwise (in the direction of the solid arrow). Rotation of the primary cam gear 62 is transmitted to the secondary cam gear 63 because of engagement of the link pin 62c and the cutout 63a, such that the secondary cam gear 63 rotates in the same direction. The rotating lever 59 stops at the initial position until the cam 62b is away from the engaging pin 61d, even if the primary and secondary cam gears 62 and 63 are rotating. While the rotating lever 59 stops at the initial position, the contact 60a is pressed by the switch portion 59b, such that the contacts 60a and 60b are contacted to each other. Thereby, the lever detection switch 60 is turned on, and generates a detection signal.

Figure 9B:
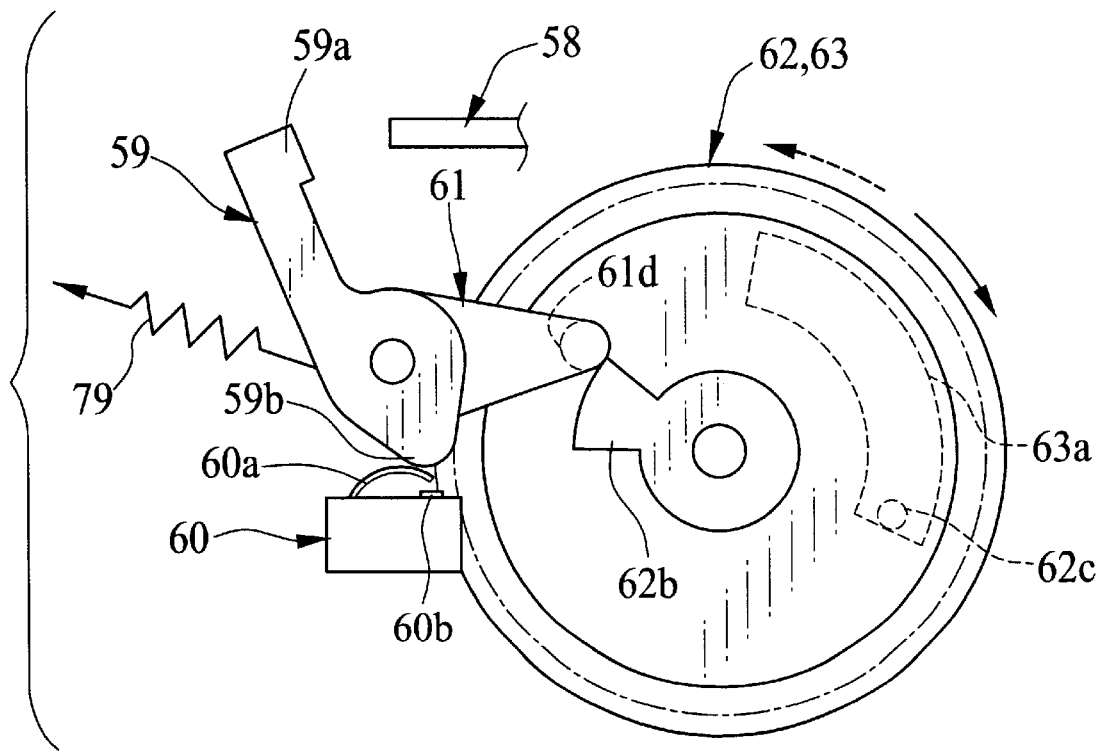
FIG. 9B is an explanatory view showing a door moving mechanism in a state where an instant film is ejected.

As shown in FIG. 9B, when the primary and secondary cam gears 62 and 63 further rotates, the cam 62b pushes the engaging pin 61d to rotate the push lever 61 and the rotating lever 59 counterclockwise against the bias of the hold spring 79. Then, the contact 60a is away from the other contact 60b, so that the lever position detection switch 60 is turned off. Since the arm position 59a is away from the slide lever 58, the lock lever 57 is never shifted to release the lock of the pack loading door 21.

Afterwards, when the cam 62b moves to the initial position that is shown in FIG. 9A, the cam 62b is away from the engaging pin 61d, such that the rotating lever 59 and the push lever 61 return back to the initial positions by the bias of the hold spring 79. Then, the lever position detection switch 60 is turned on and generates a detection signal, which causes to stop the feeding motor 65. Since rotation of the primary cam gear 62 is not transmitted soon to the secondary cam gear 63 even if the feeding motor 65 rotates inversely due to faulty operation, it is possible to make time for dealing with a problem before the instant film 30 is pulled inside the camera 2. That is, an user can pull the instant film 30 outside, turn off the power switch 40 or the like.

Figure 10A:
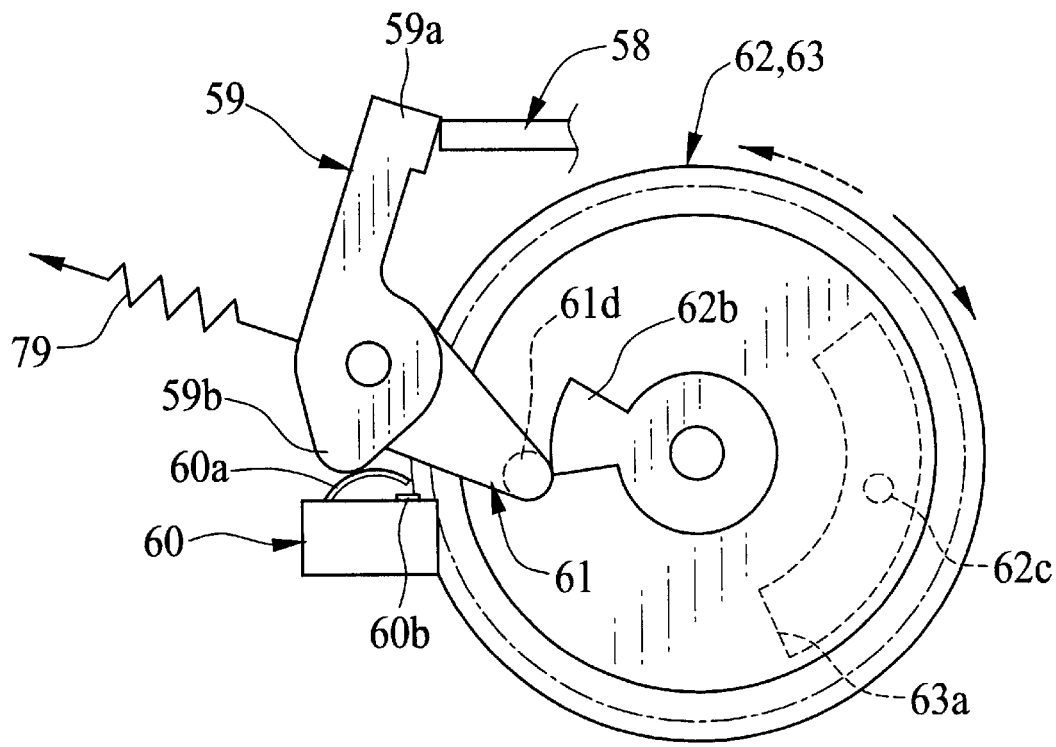
FIGS. 10A and 10B are sequential explanatory views showing a door moving mechanism which releases the lock of the pack loading door.

In pack loading door open operation, the feeding motor 65 rotates inversely, so that the primary cam gear 62 rotates counterclockwise (in the direction of the dotted arrow). As shown in FIG. 10A, the cam 62b pushes the engaging pin 61d just after the primary cam gear 62 begins rotating, such that the push lever 61 and the rotating lever 59 rotate clockwise.

The rotation of the rotating lever 59 causes the arm portion 59a to push the rear end of the slide lever 58, such that the slide lever 58 moves toward the lock lever 57. The lock lever 57 is pushed by the front end 58c of the slide lever 58, and moves from the locked position toward the released position against the bias of the lock spring 75. Thereby, as shown in FIG. 7B, the lock claw 28 is away from the lock claw 27, and the slant portion pushes the lock claw 27 to move the pack loading door 21.

Figure 10B:
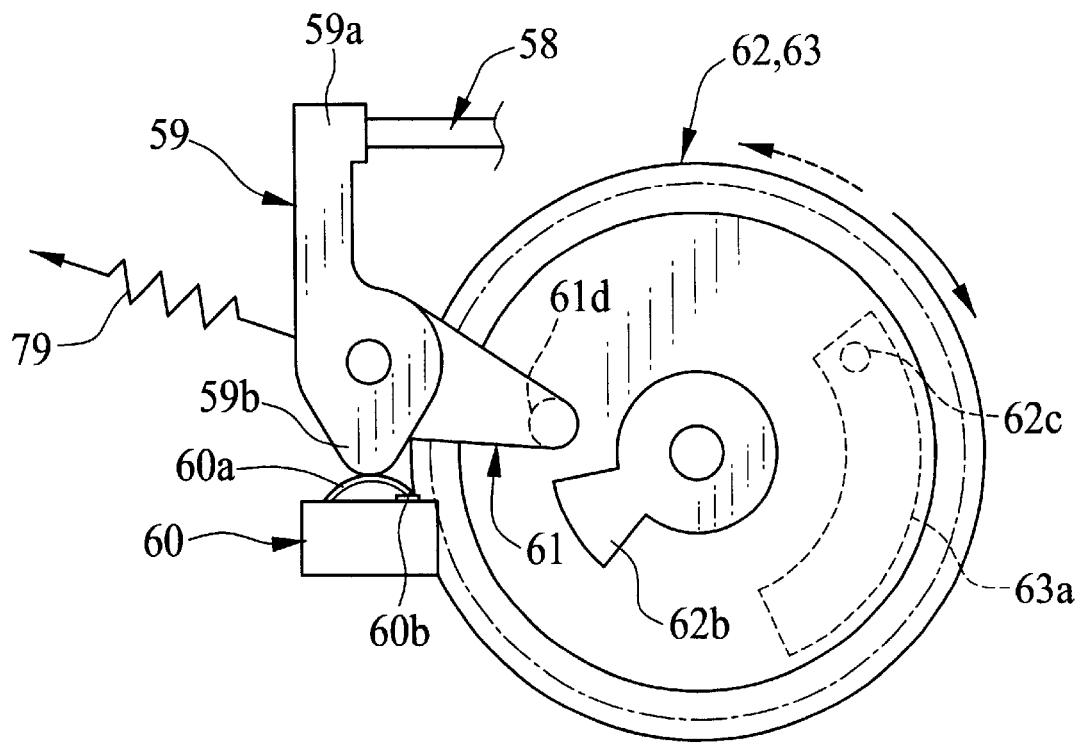
Figure 11:
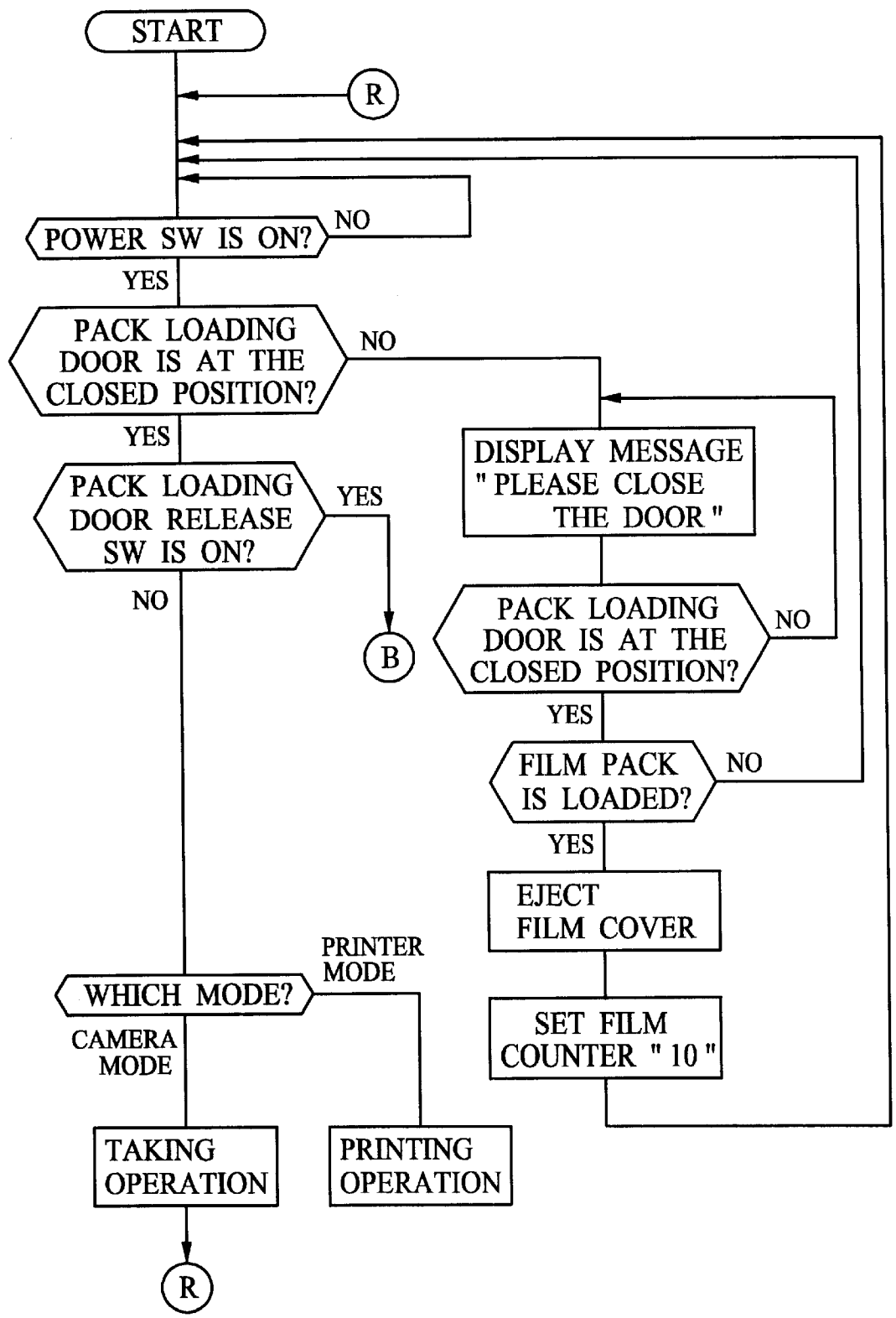
FIG. 11 is a flow chart showing a sequence of whole operation of the electronic still camera.

The lever position detection switch 60 is turned off while the cam 62b pushes the engaging pin 61d. As shown in FIG. 10B, when the cam 62b is away from the engaging pin 61d, the rotating lever 59 returns back to the initial position. Then, the lever position detection switch 60 is turned on again, and generates a detection signal which causes to stop the feeding motor 65. Since the link pin 62c is away from the edge of the cutout 63a while the feeding motor 65 is activated, rotation of the primary cam gear 62 is not transmitted to the secondary cam gear 63. Thereby, since the spread rollers 69 are stopped in pack loading door open operation, the feeding motor 65 is less loaded than ejecting the instant film 30. Therefore, it is possible to reduce the loss of the battery.

The feeding motor 65 begins rotating forward after a certain time passes since the detection signal of the lever position detection switch 60 is generated, for returning the cam 62b back to the initial position. Afterwards, the feeding motor 65 stops rotating. Thereby, the primary cam gear 62 is returned back to the initial position after the pack loading door 21 opens.

As shown in FIG. 3, the camera 2 is controlled by a system controller 81, which is comprised of a CPU, programming ROM, data RAM, and so forth. A subject light focused on by the CCD image sensor 10 is transformed into electrical image data, and transferred to a image data processing circuit 82. The image data processing unit 82 produces a video signal of the NTSC standard from the processed image data, and sends it to the LCD panel 39. Accordingly, the LCD panel 39 displays a continuous series of subject images taken through the CCD image sensor 10, serving as an electronic viewfinder.

Upon operating the shutter release button 7, the image data processing circuit 82 produces exclusive image data from a subject taken through the CCD image sensor 10 at that time, and sends it to an image processing IC 84. The image processing IC 84 stores image data in the image memory 13. In storing image data into the memory card 14, the image processing IC 84 transforms exclusive image data into widely-used image data, and stores it in the memory card 14 through the image data processing circuit 82.

Upon operating the print button 42, the image processing IC 84 produces print data from exclusive image data, and sends it to an print data processing circuit 86. The print data processing circuit 86 produces respective color data of red, green and blue, and further produces linear print data that is represented as graduated value of respective color. The linear print data is sent to the printing head 31, in which drive pulses are produced for controlling the liquid crystal segment of each pixel.

Next, referring to flow charts shown in FIGS. 11 to 15, the operation of the camera having the above described configurations will be described. Upon operating the power switch 42 in the control panel 44, the camera 2 is powered. The system controller 81 checks whether the pack loading door 21 is closed, by the existence of a detection signal from the pack loading door detection switch 34. When the pack loading door 21 is closed, the message to select either the taking mode or the printing mode is displayed on the LCD panel 39 for prompting to changing the operation mode, in spite of whether the film pack 24 is loaded in the pack loading chamber 25.

When the pack loading door 21 is open, the message "PLEASE CLOSE THE DOOR" is displayed in the LCD panel 39 for prompting to close the pack loading door 21. In closing the pack loading door 21, a detection signal is sent to the system controller 81 from the pack loading door detection switch 34. Then, the system controller 81 checks existence of the film pack 24, referring the detection signal of the film pack detection switch 35.

In case of detecting the detection signal after the pack loading door 21 is closed, the system controller 81 recognizes that an unused film pack 24 is loaded in the pack loading chamber 25. Afterwards, the system controller 81 begins to eject the film cover that covers the exposure opening of the film pack 24 from inside.

Figure 12:
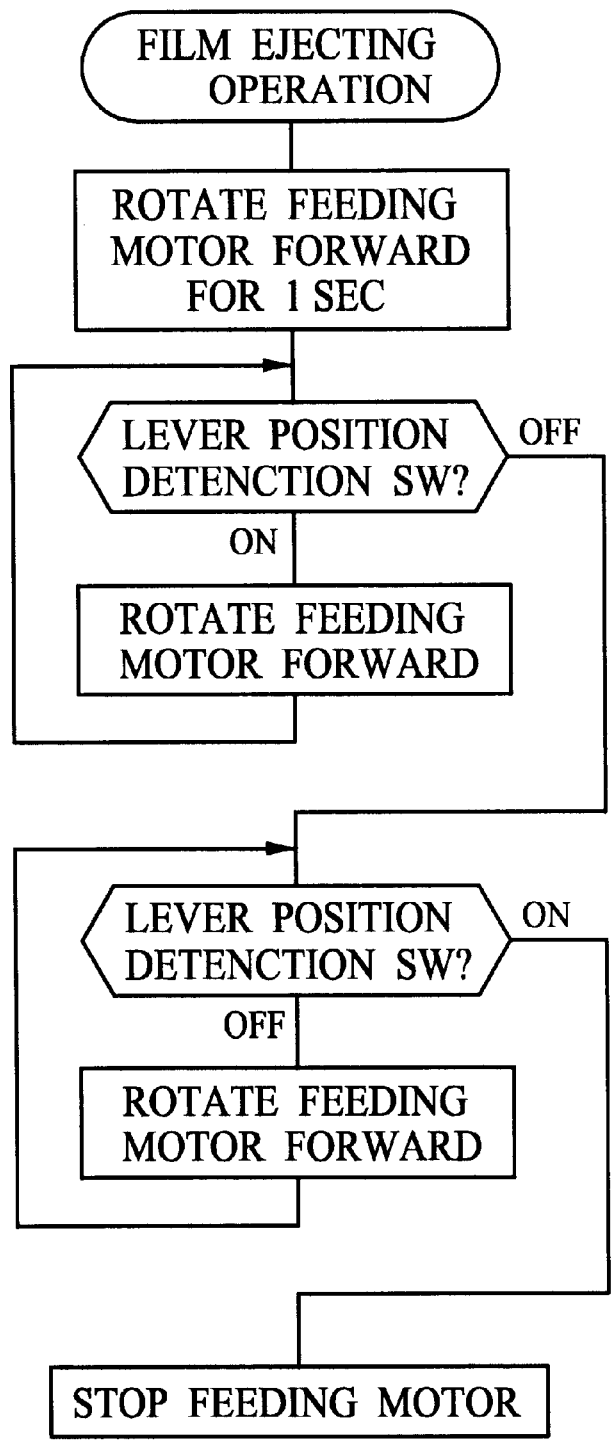
FIG. 12 is a flow chart showing a sequence of film ejecting operation.
Figure 13:
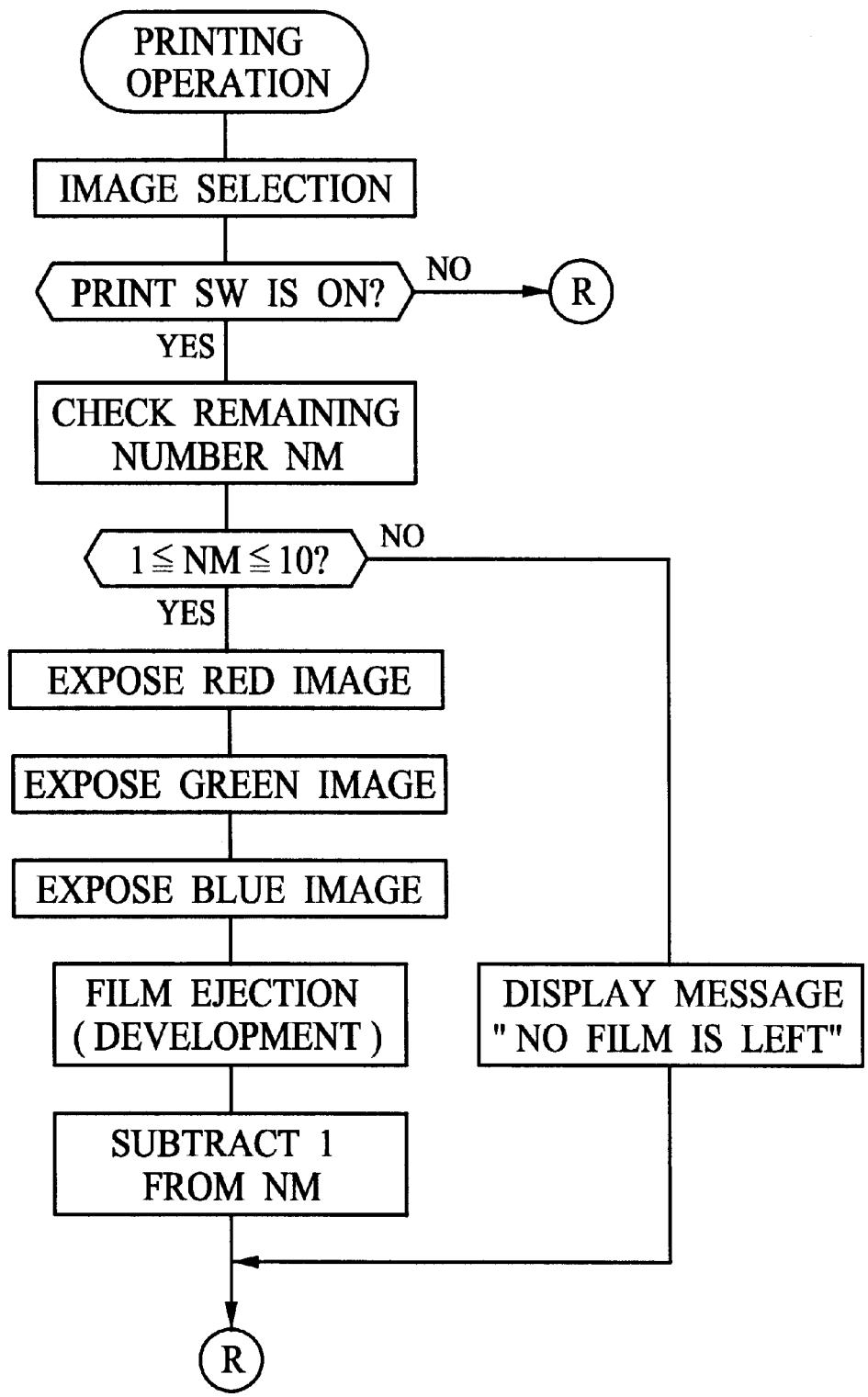
FIG. 13 is a flow chart showing a sequence of printing operation.

Sequence of film cover ejecting operation is the same as the film ejecting operation, as shown in FIG. 12. The system controller 81 controls the operation of the motor driver 88 for rotating the feeding motor 65 forward. The feeding motor 65 produces rotation to the spread rollers 69 and the claw mechanism through reduction gears.

The claw mechanism controls the claw member to push the lower end of the film cover. The film cover is advanced toward the ejection passage 55 through the ejection slit 24b. Inside the ejection passage 55, a pair of spread rollers 69 are rotating in the direction for ejecting the film cover. The film cover is inserted between the spread rollers 69, and conveyed toward the ejection door 37. The film cover pushes the ejection door 37 to open it. Then, the top end of the film cover is advanced outside the camera 2. Thereafter, by pulling the film cover from the ejection door 16, the film cover is ejected completely.

The film detection switch 70 provided inside the film ejection passage 55 checks whether the film cover is inside the ejection passage 55. When the film cover is detected, the detection switch 70 sends a detection signal to the system controller 81. Then, the system controller 81 sends a reset signal to the film counter 71 for setting the remaining number NM for ten.

In ejecting the film cover, as shown in FIGS. 6 and 9, the primary cam gear 62 rotates clockwise, and rotation is transmitted to the secondary cam gear 63 via the engagement of the link pin 62c and the cutout 63. The cam 62c pushes the engaging pin 61d to rotate the rotating lever 59 counterclockwise against the bias of the hold spring 79. Thereby, the contact 60a is released from depression of the switch portion 59b, so that the lever position detection switch 60 is turned off.

A timer circuit, incorporated in the system controller 81, counts one second after the film cover ejecting operation begins. Thereafter, the system controller 81 monitors the detection signal of the lever position detection switch 60, and stops rotating the conveyer roller 65 in detecting the detection signal. Thereby, the primary and secondary cam gears 62 and 63 are kept at the initial positions, as shown in FIG. 9B. In consideration of failure operation due to variation of initial positions of the primary and secondary cam gears 62 and 63, the system controller 81 begins monitoring the detection signal of the lever position detection switch 60 after one second since the ejection begins.

In taking a subject with the camera 2, the changing dial 41 in the control panel 44 is operated to change into the taking mode. The camera 2 is hold by the right hand gripping on the grip portion 6, so that the taking window 8 is faced to the subject. The subject taken by the CCD image sensor 10 is converted into image data, then transformed into video signal of the NTSC standard by the image data processing circuit 82, in which the video signal is sent to the LCD panel 39. Therefore, subject image taken by the CCD image sensor 10 is displayed in the LCD panel 39 in real-time fashion.

The subject is framed by the LCD panel 39 or an optical finder. Upon operating the shutter release button 7 after framing, the release switch 12 is turned on, then the subject image taken by the CCD image sensor 10 at that time is converted into exclusive image data by the image data processing unit 82.

It is predetermined by setting operational buttons in the control panel 44, to which image data is stored between the image memory 13 and the memory card 14. In case of being set to store image data into the image memory 13, exclusive image data transformed by the image data processing circuit 82 is stored into the image memory 13 via the image processing IC 84. On the other hand, in case of being set to store into the memory card 14, the image processing IC 84 transforms exclusive image data into widely-used image data, which is stored into the memory card 14 via the image data processing unit 14.

In printing operation the camera 2 is placed stably so that the pack loading door 21 becomes lower, as shown in FIG. 2. Thereafter, the changing dial 41 is operated to be set as printing mode, then the operation buttons in the control panel 44 are operated to read image data from the image memory 13 or the memory card 14. Image data is transformed into video data of NTSC standard, which is displayed on the LCD panel 39 as subject image.

In deciding an image for printing, the print button 42 is depressed while the desired image is displayed on the LCD panel 39. Then, the system controller 81 checks the remaining number that is counted in the film counter 71. When no instant film is left in the film pack 25, the system controller 81 controls the display panel 39 to display the message "NO FILM IS LEFT", for prompting to load the new film pack 24. When one or more instant film is left in the film pack 25, the system controller 82 controls the image processing IC 84 to produce print data from image data, and to sent it into the print data processing unit 86.

The print data processing unit 86 transforms print data from the image processing IC 84 into drive data for driving the printing head 31. Drive data is represented as graduation value of respective color in each pixel of the printing head 30. The printing head 31 is located at the initial position where the lower end of the instant film 30 is faced thereto. The initial position of the printing head 31 corresponds to the initial recording position for recording the first line of the instant film. When a photo sensor (not shown) detects the printing head 31 located at the initial position, the photo sensor sends a detection signal to the system controller 81. Then, the print data processing unit 86 transforms print data into drive data, and sends it to the printing head 31 line by line. The printing head 31 emits light according to the graduation value of drive data.

The red-pass filter is inserted between the light emitting element and the liquid crystal segment array, then the light emitting element emits white light, and each liquid crystal segment is activated according to the graduation value of corresponding drive data. Thereby, red printing light is projected onto the exposure surface of the instant film 30.

At the conclusion of the exposure to the red printing light for the first line, a scanning motor rotates through a certain angle to shift the printing head 31 to a position for recording the second line. As the scanning motor, a stepping motor may be used. Next, the print data processing unit 86 sends drive data corresponding to red color of second line into the printing head 31. Then, the second line of the instant film 30 is exposed to red printing light. In the same way, the instant film 30 is exposed to red printing light line by line, shifting the printing head 31 toward the spread rollers 69.

The system controller 81 sends a signal for changing the filters to the printing head 31 after exposure to the red printing light. The color filter moves inside the printing head 31 to insert the green-pass filter in the printing light path. The print data processing circuit 82 sends drive data of green in the last line to the printing head 31. Afterwards, in the same way of exposure to the red printing light, green printing light is projected onto the instant film 30 line by line from the last line to the first line. When green-color exposure is completed, the blue-pass filter is inserted in the printing light path, blue printing light is projected onto the instant film 30 in the same way.

After exposure to three-color printing light, the system controller 81 controls the feeding motor 65 to rotate forward, such that the exposed instant film 30 is ejected by the same way as ejecting the film cover. Rotation of the feeding motor 65 is transmitted to the claw mechanism and the spread rollers 69 through the reduction gears. The claw mechanism is driven to move the claw member into the film pack 24 for pushing the lower end of the instant film 30, which is faced to the exposure opening.

The pushed instant film 30 is advanced to the ejection passage 55 through the ejection slit 24b. Then, the instant film 30 is inserted between the spread rollers to be conveyed toward the ejection door 16. The pod of the instant film 30 is squeezed to be ruptured by the spread rollers 69 during conveyance. Thereby, the processing fluid is spread inside the instant film 30. The spread rollers 69 press the whole area of the instant film 30, so the processing fluid is spread uniformly inside the whole exposure area of the instant film 30. A remainder of the processing fluid is accepted in a surplus fluid accepting portion.

The instant film detection switch 70 sends a detection signal to the system controller 81 when detecting the instant film passing through the ejection passage 55. Then, the system controller 81 sends a reduction signal to the film counter 71, in which the remaining number NM is set for nine.

While the instant film 30 is advanced by the spread rollers 69, the primary and secondary cam gears 62 and 63 are rotating. Thereafter, the primary cam gear 62 reaches the initial position where the cam 62b is away from the engaging pin 61d, as shown in FIG. 9A. Then, the lever position detection switch 60 is turned off, the feeding motor 65 is also turned off. The instant film 30 is advanced outside the top wall of the camera 2 through the ejection door 37. After a certain time, positive image is developed on a receiving sheet of the instant film 30. Thereby, a printed photo film is obtained as a hard copy of a subject image, which is displayed in the LCD panel 39 at that time when the print button 42 is operated.

It is possible that the feeding motor 65 rotates inversely in ejecting the instant film 30 somehow or other. However, since rotation of the primary cam gear 62 is transmitted to the secondary cam gear 63 and the spread rollers 69 with a certain delay in changing the rotational direction, the instant film 30 is not pulled inside the camera 2. Therefore, it is capable of pulling the instant film 30 outside the camera 2 or turning off the power, so the instant film 30 is never stopped inside the camera 2.

Figure 14:
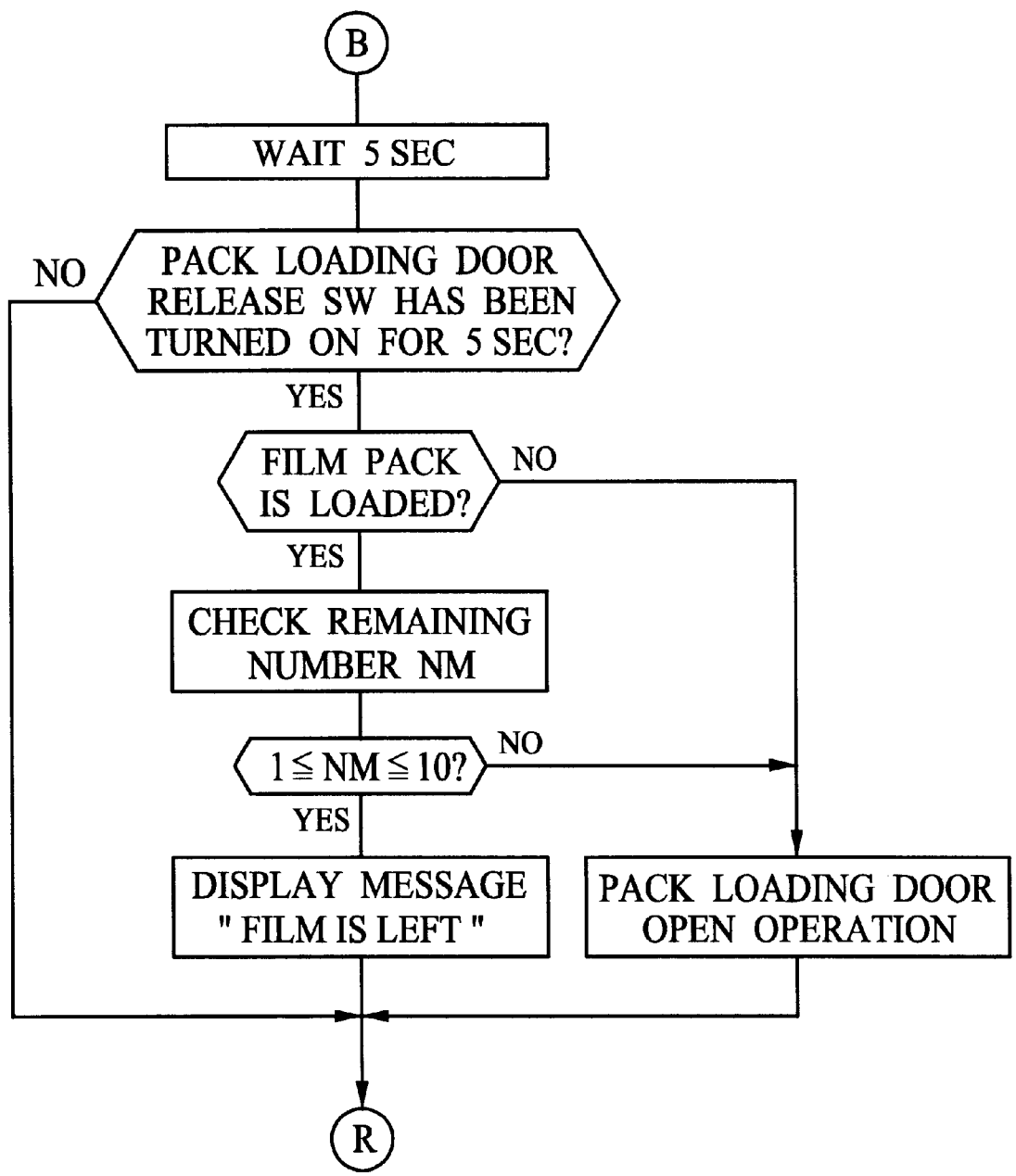
FIG. 14 is a flow chart showing a sequence for judging whether to open the pack loading door.

While taking and printing are carried out in the way described above, the lock release button 22 for releasing the lock of the pack loading door 21 is possible to be faultily operated. As shown in FIG. 14, upon operating the lock release button 22, the pack loading door release switch 23 is turned on and sends a count signal to the system controller 81. The system controller 81 controls an internal timer circuit for counting the turn-on time when the pack loading door release switch 23 is turned on. If the turn-on time is equal to or more than five seconds, the system controller 81 releases the lock of the pack loading door 21. Thereby, the pack loading door 21 is never opened even if the lock release button 22 is faultily operated.

When the lock release button 22 is depressed for more than or equal to five seconds, the system controller 81 checks existence of film pack 24 in the pack loading chamber 25 by a detection signal from the film pack detection switch 35. If the film pack 24 is not loaded inside the pack loading chamber 25, the system controller controls the door moving mechanism to open the pack loading door 21. If the film pack 24 is loaded, the system controller 81 checks the instant film by referring the remaining number NM that is indicated in the film counter 71. Consequently, if no instant film is left in the film pack 24, the system controller 81 controls the door moving mechanism to open the pack loading door 21. Otherwise, the system controller 81 control the LCD panel 39 to display the message "FILM IS LEFT", for notifying an user of failure operation.

Figure 15:
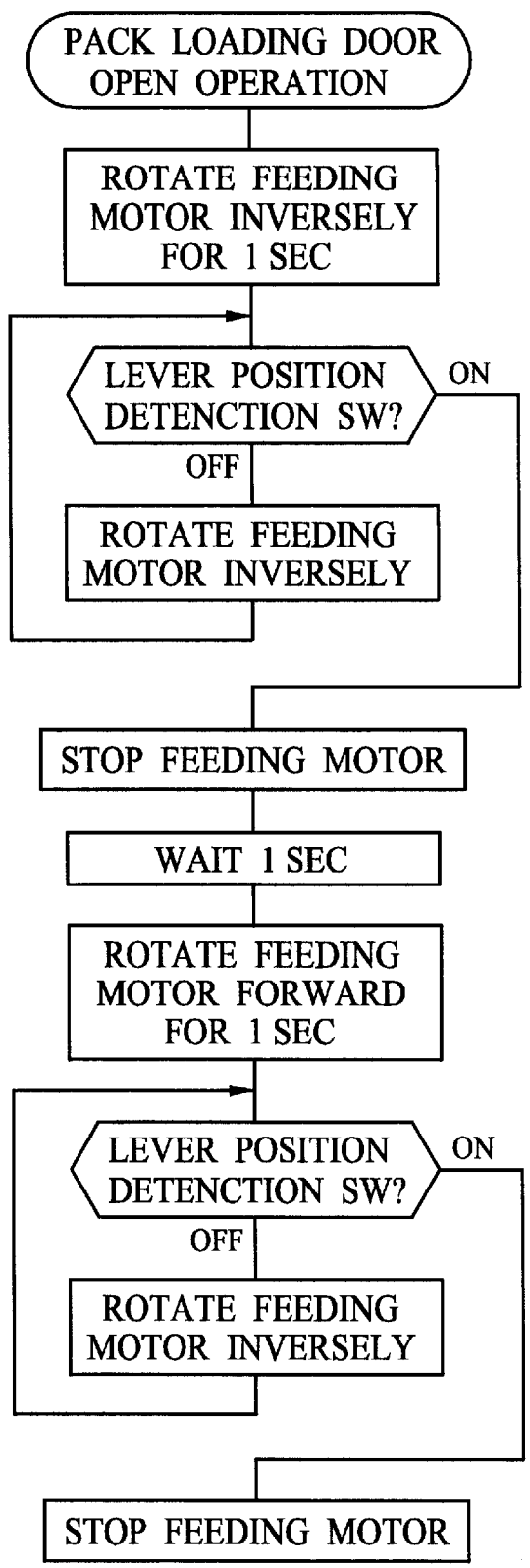
FIG. 15 is a flow chart showing a sequence of pack loading door open operation.

FIG. 15 shows a flow chart of the pack loading door open operation. At first, the feeding motor 65 rotates inversely in ejecting the instant film 30. As shown in FIG. 10A, the cam 62b presses the engaging pin 61d just after the primary cam gear 62 rotates counterclockwise. The push lever 61 and the rotating lever 59 rotates clockwise against the bias of the hold spring 79, so the lever position detection switch 60 is turned off. As shown in FIG. 8, since the arm portion 59a pushes the rear end of the slide lever 58, the slide lever 58 moves such that the slant surface of the front end 58c pushes the rear end 57c of the lock lever 57.

The lock lever 57, pushed by the slide lever 58, slides in the direction of the arrow against the bias of the lock spring 75. At that time, the lock claw 28 moves away from the lock claw 27. Then, the slant portion 73 pushes the lock claw 27. Thereby, the pack loading door 21 is released to open the pack loading chamber 25. While the rotating lever 59 presses the slide lever 58, the lever position detection switch 60 is turned off, so the OFF signal is sent to the system controller 81.

When the cam 62b is away from the engaging pin 61d due to the farther rotation of the primary cam gear 62, as shown in FIG. 10B, the rotating lever 59 returns back to the initial position by the bias of the hold spring 79. At that time, the lever position detection switch 60 is turned on, and the ON signal is sent to the system controller 81. The system controller 81 controls the feeding motor 65 to stop rotating. Since the link pin 62c is away from the cutout 63a while the pack loading door 21 is open, rotation of the primary cam gear 62 is not transmitted to the secondary cam gear 63. The spread rollers 69 are stopped. Therefore, the feeding motor 65 is less loaded than in ejecting the instant film 30.

Since the rotating lever 59 returns back to the initial position, the lock lever 57 returns back to the locked position by the bias of the lock spring 75. Since the lower portion of the pack loading door 21 is biased toward the open position, the lock claw 28 is never engaged with the lock claw 27 after the slant portion 73 stops pushing the click to be engaged 27. Therefore, the pack loading door 21 is kept to be unlocked.

After the feeding motor 65 stops rotating, the system controller 81 controls the internal timer circuit to count one second, and controls the feeding motor 65 to rotate forward. Then, the primary cam gear 62 rotates clockwise in FIG. 10A. Just after the primary cam gear 62 begins rotating, the cam 62b pushes the engaging pin 61d to rotate the push lever 61 and the rotating lever 59 counterclockwise against the bias of the hold spring 79. Then, the lever position detection switch 60 is turned off again.

When the cam 62b is away from the engaging pin 61d due to the further rotation of the primary cam gear 62, as shown in FIG. 9A, the rotating lever 59 returns back to the initial position by the bias of the hold spring 79. At that time, the lever position detection switch 60 is turned on, and the ON signal is sent to the system controller 81. The system controller 81 controls the feeding motor 65 to stop rotating. Then, the primary cam gear 62 returns back to the initial position.

In opening the pack loading door 21, the system controller 81 waits for one second from rotating the feeding motor 65 to detecting the signal from the lever position detection switch 60, for preventing failure operation due to variation of initial positions of the primary and secondary cam gears 62 and 63. Accordingly, a mechanism for preventing variation of the cam gears 62 and 63 may be used for saving the operation to count one second.

By loading the unused film pack 24 into the pack loading chamber 25 after the pack loading door 21 opens, printing operation can be carried out. Without the film pack 24, taking operation can be carried out by setting the taking mode with the changeover dial 41. The slant surfaces of the lock claw 27 and the lock claw 28 helps the lock lever 57 to be slid toward the released position. Thus, the click to be locked 27 and the lock claw 28 are engaged with each other by pushing the pack loading door 21 to the closed position.

In the above described embodiment, the present invention has been described with respect to the electronic still camera having a printing device, but the present invention is also applicable to a printer without an electronic still camera, in which an instant film is used. The present invention is also applicable to an ordinary instant printer.

Other than a printer in which an instant film is used, the present invention is also applicable to a printer in which a photosensitive materials such as a photosensitive paper and a thermosensitive recording paper fixed by ultraviolet rays.

In the above described embodiment, an error message is displayed in the LCD panel in failure operation. It is possible to sound an alarm with displaying the error message. Furthermore, for maintenance or repairing, the pack loading door may be opened even if an instant film is left in the pack loading chamber.

Thus, the present invention is not to be limited to the above embodiments, but on the contrary, various modifications are possible to those skilled in the art without departing from the scope of claims appended hereto.

What is claimed is:

1. A photo printer for recording an image by projecting printing light onto a photosensitive recording material, said photo printer comprising:

a printing head which projects said printing light onto said photosensitive recording material;

a loading chamber for containing a plurality of said photosensitive recording materials;

a lid member that is movable between an open position where said loading chamber is open and a closed position where said loading chamber is closed;

developing means for carrying out development during ejecting said photosensitive recording material outside of said photo printer;

counting means for counting remaining number that represents an amount of said photo-sensitive recording material left inside said loading chamber;

a lid moving mechanism that is changeable between a lock state where said lid member is locked at said closed position, and a release state where said lid member is released and allowed to move to said open position; and control means for checking said remaining number and prohibiting said lid moving mechanism from changing into said release state when said remaining number is equal to or more than one.

2. A photo printer as claimed in claim 1, wherein said lid moving mechanism comprises an operation member that is operated externally for opening said lid member, and said control means checks said remaining number when said operation member is operated over a predetermined time continuously.

3. A photo printer as claimed in claim 2, wherein said counting means reduces said remaining number by one each time said photosensitive recording material is ejected outside of said photo printer, and sets said remaining number for an initial value when a certain amount of said photosensitive recording materials are loaded in said loading chamber.

4. A photo printer as claimed in claim 3, further comprising electromagnetic driving means for activating said lid moving mechanism and said developing means.

5. A photo printer as claimed in claim 4, further comprising delay transmitting means for delaying to transmit driving force of said electromagnetic driving means to said developing means.

6. A photo printer as claimed in claim 5, wherein said lid moving mechanism further comprises:

a lock lever that is movable between a keep position for keeping said lid member at said closed position and a release position for releasing said lid member, wherein said lock lever is biased toward said keep position at all times; and a rotating lever that is disposed between said electromagnetic driving means and said lock lever, wherein said rotating lever pushes said lock lever toward said release position when rotating forward and retracts from said lock lever when rotating inversely.

7. A photo printer as claimed in claim 6, wherein said electromagnetic driving means comprises:

a feeding motor for feeding said photosensitive recording material toward outside of said photo printer;

a primary gear for transmitting rotation of said feeding motor to said rotating lever; and a secondary gear for transmitting rotation of said primary gear to said developing means.

8. A photo printer as claimed in claim 7, wherein said primary gear rotates said rotating lever inversely when said feeding motor rotates in a first direction, and said primary gear rotates said rotating lever forward when said feeding motor rotates in a second direction.

9. A photo printer as claimed in claim 8, wherein said delay transmitting means comprises:

a pin that is attached to said primary gear; and a groove that is provided in said secondary gear;

wherein said pin inserts into said groove, and rotation of said primary gear is not transmitted to said secondary gear while said pin moves along said groove.

10. A photo printer for recording an image by projecting printing light onto a photosensitive recording material, said photo printer comprising:

a printing head which projects said printing light onto said photosensitive recording material;

a loading chamber for containing a plurality of said photosensitive recording materials;

a lid member that is movable between an open position where said loading chamber is open and a closed position where said loading chamber is closed;

developing means for carrying out development during ejecting said photosensitive recording material outside of said photo printer;

a feeding motor for actuating said developing means;

a lid moving mechanism that is driven by said feeding motor and changeable between a lock state where said lid member is locked at said closed position, and a release state where said lid member is released and allowed to move to said open position; and a lock release means for releasing said lid member, wherein a message is generated when said lock release means is actuated while said loading chamber contains at least one of said photosensitive recording materials, said message indicating the presence of said at least one of said photosensitive recording materials.

11. A photo printer as claimed in claim 10, further comprising:

an operation member that is operated externally for opening said lid member; and control means that changes said lid moving mechanism into said release state when said loading chamber does not contain any photosensitive recording material and said operation member is operated over a predetermined time continuously.

12. A photo printer as claimed in claim 11, wherein said developing means is driven when said feeding motor rotates in a first direction, and said lid moving mechanism is driven when said feeding motor rotates in a second direction.

13. A photo printer for recording an image by projecting printing light onto a photosensitive recording material, said photo printer comprising:

a printing head which projects said printing light onto said photosensitive recording material;

a loading chamber for containing a plurality of said photosensitive recording materials;

a lid member that is movable between an open position where said loading chamber is open and a closed position where said loading chamber is closed;

developing means for carrying out development during ejecting said photosensitive recording material outside of said photo printer;

a feeding motor for actuating said developing means;

a lid moving mechanism that is changeable between a lock state where said lid member is locked at said closed position, and a release state where said lid member is released and allowed to move to said open position;

an operation member that is operated externally for opening said lid member; and control means that changes said lid moving mechanism into said release state when said operation member is operated over a predetermined time continuously.

14. A photo printer as claimed in claim 13, wherein said developing means is driven when said feeding motor rotates in a first direction, and said lid moving mechanism is driven when said feeding motor rotates in a second direction.

* * * * *